United States Patent [19]
Rancourt et al.

[11] Patent Number: 6,006,869
[45] Date of Patent: Dec. 28, 1999

[54] VENTILATED DISC BRAKE

[76] Inventors: Claude Rancourt, 12440, 1ere Avenue Est, St. Georges, Beauce County, Quebec, Canada, J7C 3V3; Yvon Rancourt, 779 Boulevard Industriel, Blainville, Quebec, Canada, J7C 3V3

[21] Appl. No.: 08/852,049

[22] Filed: May 6, 1997

Related U.S. Application Data

[60] Division of application No. 08/231,747, Apr. 25, 1994, Pat. No. 5,651,430, which is a continuation-in-part of application No. 07/890,801, Jun. 1, 1992, Pat. No. 5,330,034, which is a continuation-in-part of application No. 07/861,419, Mar. 31, 1992, abandoned.

[51] Int. Cl.$^6$ ..................................................... F16D 55/36
[52] U.S. Cl. ......................... 188/71.5; 188/71.7; 188/170
[58] Field of Search .................................. 188/170, 18 A, 188/72.6, 106 F, 71.7, 71.5, 71.6, 72.4, 1.11 E; 307/71; 267/177

[56] References Cited

U.S. PATENT DOCUMENTS

| | | |
|---|---|---|
| 2,731,619 | 1/1956 | Fratus . |
| 2,852,757 | 9/1958 | Fawick . |
| 3,244,260 | 4/1966 | Frayer . |
| 3,547,234 | 12/1970 | Cummins et al. . |
| 3,613,839 | 10/1971 | MacDuff . |
| 3,770,085 | 11/1973 | Cottingham . |
| 3,893,549 | 7/1975 | Bennett ................................... 188/170 |
| 3,946,837 | 3/1976 | Houser . |
| 3,974,896 | 8/1976 | Rach ....................................... 188/170 |
| 4,057,297 | 11/1977 | Beck et al. . |
| 4,102,438 | 7/1978 | Rancourt . |
| 4,186,822 | 2/1980 | Khuntia et al. . |
| 4,280,594 | 7/1981 | Baum . |
| 4,473,141 | 9/1984 | Mochida . |
| 4,520,661 | 6/1985 | Tamai et al. . |
| 4,658,936 | 4/1987 | Moseley . |
| 4,664,239 | 5/1987 | Symes et al. . |
| 5,035,303 | 7/1991 | Sullivan . |
| 5,205,380 | 4/1993 | Paquet et al. ........................... 188/72.6 |
| 5,285,190 | 2/1994 | Humphreys et al. . |

FOREIGN PATENT DOCUMENTS

| | | |
|---|---|---|
| 1112189 | 11/1981 | Canada . |
| 1140486 | 2/1983 | Canada . |
| 38370 | 10/1981 | European Pat. Off. . |
| 300756 | 1/1989 | European Pat. Off. . |
| 2006900 | 5/1979 | United Kingdom . |
| 2174772 | 11/1986 | United Kingdom . |

*Primary Examiner*—Robert J. Oberleitner
*Assistant Examiner*—Sarah Sawhill
*Attorney, Agent, or Firm*—Birch, Stewart Kolasch & Birch, LLP

[57] ABSTRACT

A ventilated disc brake assembly including an annular housing mounted to the vehicle, The disc has a first radial planar friction surface and a first brake shoe is provided adjacent the first friction surface movable. The first brake shoe is a radial annular plate having at least a planar surface to engage the first planar friction surface. A movable spring abutment is mounted for axial movement within the housing between the intermediate wall and a housing wall such that the intermediate wall is between the movable spring abutment and the first brake shoe. Rigid pusher link members extend between the spring abutment and the first brake shoe. Springs are arranged in an annular array and extend between the housing wall and the spring abutment such that the springs urge against the spring abutment to press the first brake shoe against the first friction surface of the disc. A first annular radially extending fluid bladder is provided between the intermediate wall and the spring abutment whereby the first bladder, when expanded, forces the spring abutment to overcome the spring to release the first brake shoe from the first friction surface of the disc, and the brake assembly being provided with conduit for directing a cooling gas to the ventilated discs in order to dissipate heat therefrom.

11 Claims, 7 Drawing Sheets

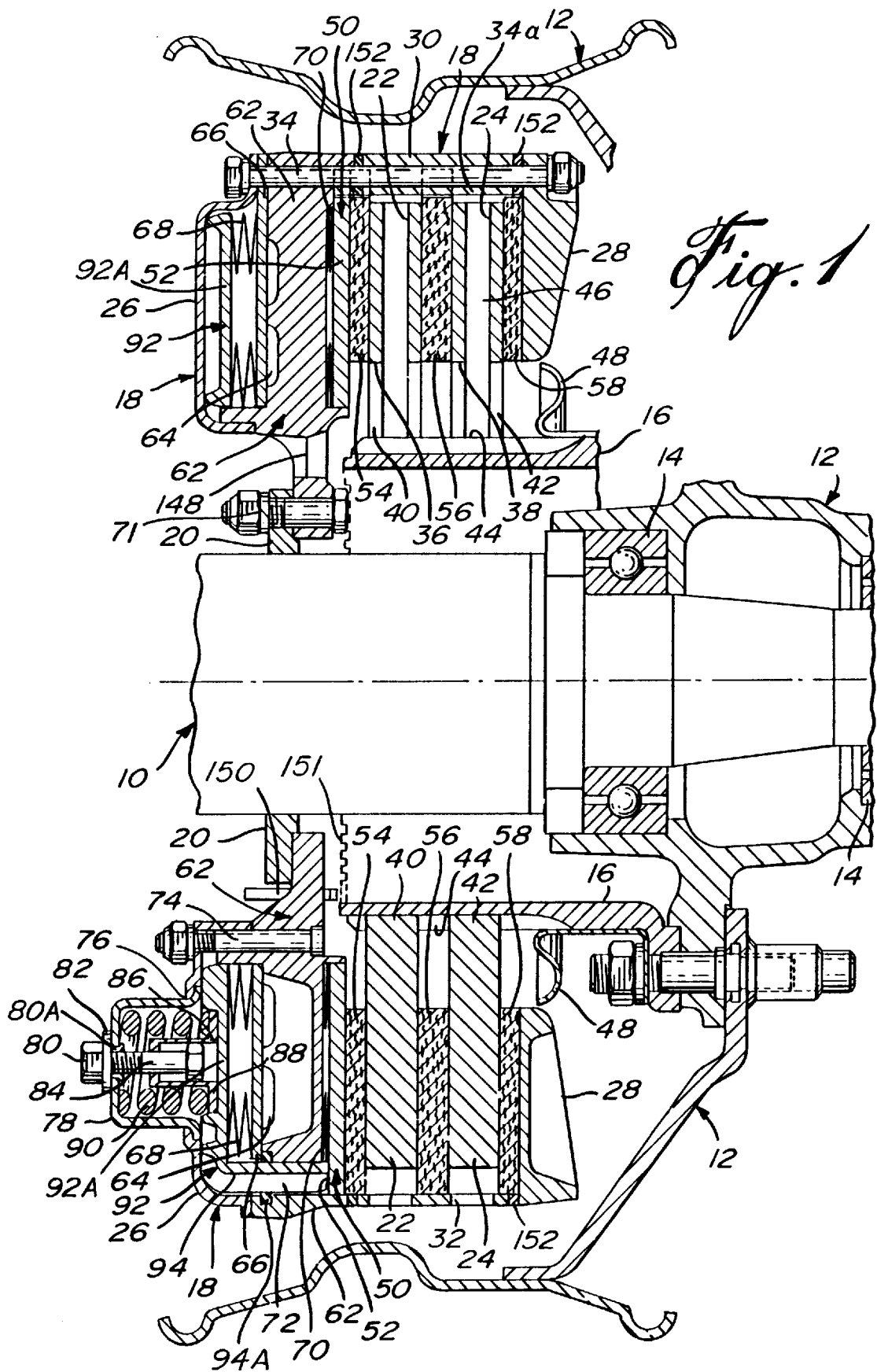

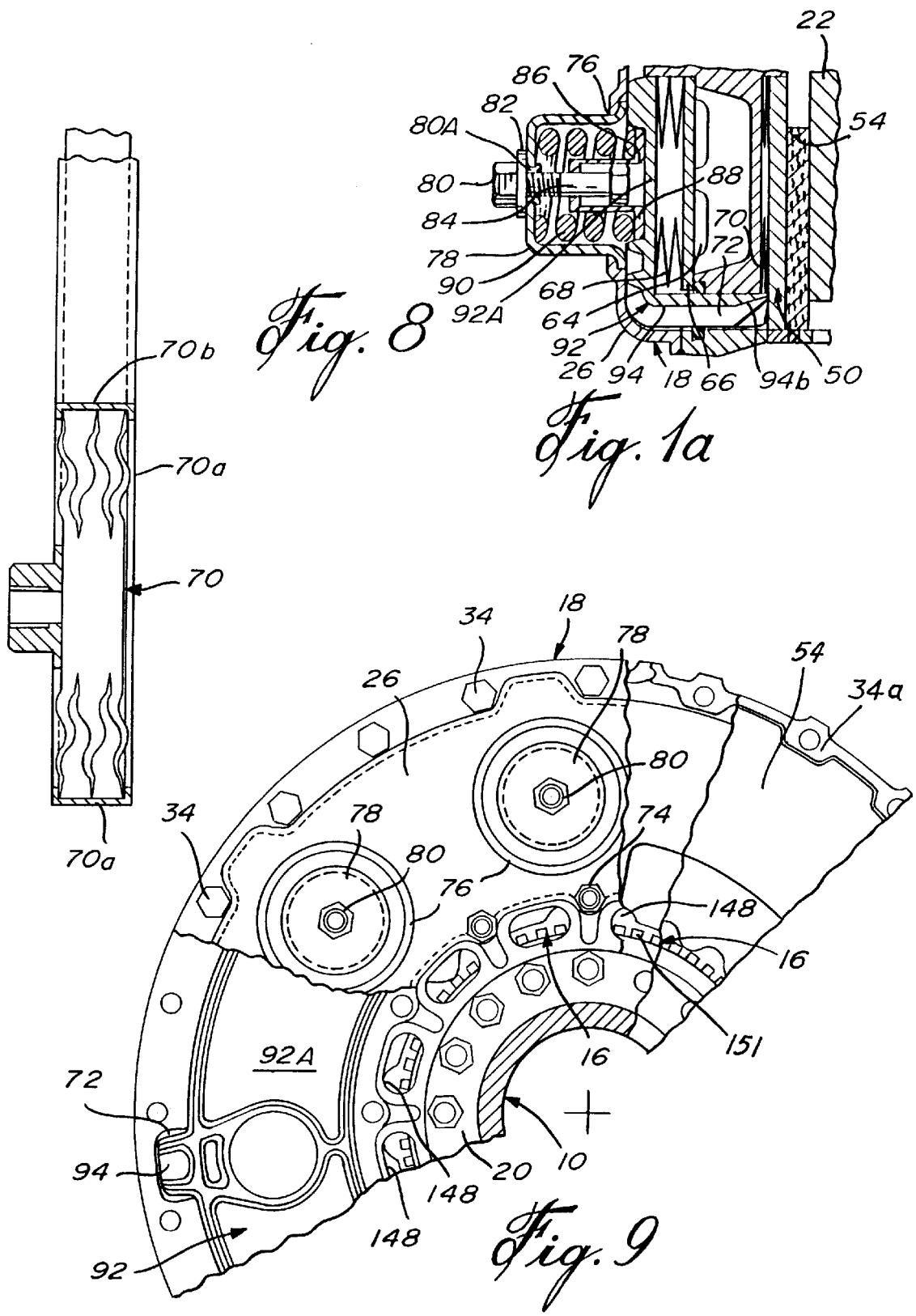

VENTILATED DISC BRAKE

CROSS-REFERENCE TO RELATED APPLICATIONS

The present application is a Divisional application of application Ser. No. 231,747 filed Apr. 25, 1994 now U.S. Pat. No. 5,651,430 issued on Jul. 29, 1997 which is a continuation-in-part application of application Ser. No. 890,801 filed Jun. 1, 1992 now U.S. Pat. No. 5,330,034 issued Jul. 19, 1994 which was a continuation-in-part application of application Ser. No. 861,419 filed Mar. 31, 1992 now abandoned.

BACKGROUND OF THE INVENTION

1. Field of the Invention

The present invention relates to disc brakes and more particularly to improvements in large area contact disc brakes for large vehicles such as trucks, tractor-trailer vehicles in addition to other large wheeled vehicles and aircrafts.

2. Description of the Prior Art

Canadian Patents 1,112,189, issued Nov. 10, 1981, and 1,140,486, issued Feb. 1, 1983, U.S. Pat. No. 4,102,438, issued Jul. 25, 1978, Yvon Rancourt, and U.S. Pat. No. 5,205,380, issued Apr. 27, 1993, which are incorporated herein by reference, describe a disc brake for heavy road vehicles wherein the brake shoes are in contact with the much larger disc area, and a suitable brake cooling system is provided to cool the disc, thus making disc brakes practical for such vehicles. The present invention is an improvement over the above-mentioned patent.

There are braking systems available on various types of vehicles which include a positive mechanical brake of the type known as a fail-safe brake, that is, where the brakes are applied when pressure is released from the brakes. U.S. Pat. No. 3,547,234, Cummins, Dec. 15, 1970, describes a service brake for earth-moving trucks or tractors which includes a hydraulic brake system using a plurality of discs, and these discs are mechanically preloaded by a spring to provide a fail-safe brake. U.S. Pat. No. 4,057,297, Nov. 8, 1977, Beck et al, includes a brake system which has been preloaded by means of a spring, including the discs of the type described in the Cummins Patent. This pressurized air operated system uses a series of valves to modify the pressure exerted on the torque converter in order to avoid damage to the differential. This is a system that is utilized in very heavy machinery such as tractors, etc. These patents represent the state of the art in terms of fail-safe type brake systems using preloaded mechanical devices such as springs. The structures are complicated by the need to be adapted on heavy vehicles. What is required is a fail-safe type brake system of simple construction using pneumatic pressure for releasing the brakes and utilizing a simple disc brake construction of the type described in the Rancourt Patents wherein the disc is mounted to the adapter sleeve of a wheel on the vehicle and the brake housing is mounted to the vehicle on a dead axle.

It is also recognized that a major problem with large contact-area annular disc brakes of the type described in the above patents is heat. Great strides in improving heat dissipation were achieved with the introduction of vented discs as described in U.S. Pat. No. 4,102,438. However, vented discs of the type described required a thicker disc to retain the same strength. It was found for instance that it was not possible to house more than one cast-iron vented disc in an in-wheel brake housing, thus reducing the flexibility of design of such brakes, especially where multiple discs might be an advantage.

Another problem which has had a serious social impact is brake failure due to wear. Presently, there is no known reliable brake wear gauge for determining the remaining life of a particular set of brake linings on a truck vehicle. It is necessary to remove housing parts on the wheel in order to examine and measure the remaining thickness of the lining and the brake disc. Since such examination adds to the down time of the truck or tractor-trailer, the tendency of the operator or driver-operator is to delay such inspection, with sometimes disastrous results, often costing innocent lives in highway accidents due to failed brakes of such large vehicles.

SUMMARY OF THE INVENTION

It is an aim of the present invention to provide a disc brake for heavy road vehicles which relies on mechanical means for applying or actuating the brakes.

It is a further aim of the present invention to provide automatic security in the event of a malfunction in the braking system.

It is a further aim of the present invention to provide a parking brake integrated with the disc brake assembly within the same housing in order to free up the axle.

It is a further aim of the present invention to provide a disc brake assembly which has a greater capacity to dissipate heat.

It is still a further aim of the present invention to provide a disc brake assembly which has an improved means for monitoring temperature and wear in a brake assembly.

It is a further aim of the present invention to provide an aircraft disc brake assembly which has means to rotate the wheels of an aircraft to provide rotation of the wheels before touch down so that the rate of rotation approximates the rate of rotation after touch down.

A construction in accordance with the present invention includes a disc brake assembly for a vehicle wheel on a vehicle, wherein the wheel includes a hub journaled through a wheel mounting means on the vehicle. The brake assembly includes a housing mounted to the vehicle and at least a radial disc within the housing mounted to the wheel. The disc has at least a first radial planar friction surface, and a brake shoe is provided adjacent the planar friction surface movable axially towards and away from the first friction surface of the disc for friction engagement therewith and release thereof. Means are provided for restraining the brake shoe means from rotating with the disc. An intermediate wall member is mounted within the housing and is fixed thereto, parallel with the first radial disc friction surface, and located such that the brake shoe means moves between the intermediate wall and the radial disc. A movable plate means is mounted for axial movement within the housing between the intermediate wall and a housing wall, such that the intermediate wall is between the movable plate means and the brake shoe means. Rigid link members extend between the plate means and the brake shoe means through the intermediate wall such that the plate means moves axially with the brake shoe means. Spring means extend between the housing wall and the plate means such that the spring continually urges against the plate means to press the brake shoe assembly means against the first friction surface of the disc. A fluid bladder means is provided between the intermediate wall and the plate means whereby the bladder, when expanded, forces the plate means to overcome the spring means to release the brake shoe means from the friction surface of the disc.

In a more specific embodiment of the present invention, the brake shoe assembly means includes a backing plate mounting the brake shoes, and the backing plate extends parallel to the intermediate wall and is in direct contact with the link members. A second pneumatic bladder is provided between the backing plate and the intermediate wall such that, when the brakes are being actively applied, pneumatic pressure is applied to expand the second bladder such as to actively urge the brake shoe assembly means against the first friction surface of the disc. In certain circumstances, while the second bladder is being inflated, the first bladder is deflated.

In a more specific embodiment of the present invention, the radial disc is provided with a second radial friction surface on the other side of the disc relative to the first friction surface, and a second brake shoes means is mounted within the housing adjacent the second friction surface of the disc, and the disc is mounted to the wheel through an adapter sleeve by means of axial splines such that the disc is capable of slight axial movement. The second bladder could alternatively be mounted between a backing plate for the second brake shoe means and the housing.

In a more specific embodiment, the intermediate wall member is mounted to a radial mounting plate mounted to the wheel mounting means of the vehicle, and the housing is fixedly mounted to the mounting plate.

In a still more specific embodiment of the present invention, the housing means is an annular housing provided with a central axial opening through which an axle forming part of the wheel mounting means of the vehicle extends therethrough, and the mounting plate is an annular ring mounted to the axle while the disc is an annular disc mounted on axial splines of an adapter sleeve projection extending from the wheel through a central opening of the disc.

A construction in accordance with a further aspect of the present invention comprises a brake assembly for a vehicle wheel having a brake housing adapted to be contained in the wheel, mounting means for securing the housing to the vehicle, at least an annular rotor disc mounted within the housing for rotation with the wheel, the disc having a plurality of circumferentially spaced channels extending from the periphery of the disc towards the center to communicate with central openings at the inner margin of the annular disc such that air can pass from the central openings at the inner margin of the annular disc to exhaust at the outer periphery thereof in order to dissipate heat generated at the disc, means defining openings in the housing to allow air flow from the exterior of the housing through the housing openings, means for directing the air flow through the housing to the central openings in the disc, and deflector means mounted on the exterior of the housing for diverting air to the openings in the housing.

In another aspect of the present invention there is provided an annular rotor disc for a disc brake assembly having at least one radial planar braking surface, brake shoe means for engaging the braking surface of the disc, characterized in that at least a shallow groove extends across the braking surface generally radially thereof whereby an air cushion is provided between the rotor disc and the brake shoe means when the brake shoe means is released from the braking surface of the disc by reason of the "pumping" of the air from the center of the disc radially towards the periphery of the disc during rotation of the disc. The groove also acts, when the brakes are being applied, as a channel for draining liquid and other debris resulting from the frictional contact of the brake shoe means and the braking surface of the disc.

In another aspect of the present invention a construction includes a disc brake assembly for a vehicle wheel wherein the wheel includes a hub journaled to an axle on the vehicle, the disc brake assembly is within the confines of the wheel and concentric with the axle, the disc brake assembly includes a housing mounted to the vehicle and at least a radial disc within the housing and means mounting the disc to the wheel, the disc having at least a first radial planar friction surface, a first brake shoe provided adjacent the first planar friction surface of the disc, movable axially towards and away from the first friction surface of the disc for friction engagement therewith and release thereof, means provided for restraining the first brake shoe from rotating with the disc, an intermediate wall member mounted within the housing and fixed thereto extending parallel with the radial disc and located such that the first brake shoe moves axially between the intermediate wall and the radial disc, a movable spring abutment means mounted for axial movement within the housing between the intermediate wall and the housing wall such that the intermediate wall is between the movable spring abutment means and the first brake shoe, pusher link members extending between the spring abutment means and the brake shoe passing through the intermediate wall such that the spring abutment means moves axially with the brake shoe, spring means extending between the housing wall and the spring abutment means such that the spring means urges against the spring abutment means to press the brake shoe against the friction surface of the disc, a first fluid bladder being provided between the intermediate wall and the spring abutment means whereby the first bladder when expanded forces the spring abutment means to overcome the spring means to release the brake shoe from the friction surface of the disc, thus releasing the parking brakes, a second bladder being provided between the intermediate wall and the brake shoe such that when expanded service brakes will be applied by the application of the brake shoe to the friction surface of the disc characterized in that quick release valve means are mounted to the intermediate wall and communicate with the second bladder in order to evacuate gas from the second bladder to accelerate the modulation of the second bladder and to circulate the gas along the intermediate wall in order to help dissipate heat therefrom.

In a more specific embodiment of the present invention thermal-sensing means are associated with the intermediate wall and with a housing wall and means are provided for communicating the data from the sensing means to a display means.

In a further aspect of the present invention there is provided a disc brake assembly for a vehicle wheel wherein the assembly comprises a brake housing defining an interior chamber, mounting means for securing the housing to a vehicle, at least an annular rotor disc mounted within the housing, the brake disc having at least one planar braking surface, means mounting the annular rotor disc to the wheel, at least one brake shoe means disposed within the housing on the planar braking surface side of the disc and mounted for axial movement towards and away from the disc, the brake shoe means including brake lining means adapted to be in contact with the planar braking surface of the disc, means provided for restraining the brake shoe means from rotating with the disc, a movable spring abutment means mounted for axial movement within the housing and rigid pusher link members extending between the spring abutment means and the brake shoe means, spring means extending between the housing wall and the spring abutment means such that the spring urges against the spring abutment means to press the brake shoe means against the first friction surface of the disc and a brake shoe wear sensing means including means indicating changes in the distance between the housing wall and the spring abutment means such that when the brake linings and disc have worn, such wear will be discernible from the brake wear sensing means.

In this specification, parking or safety brakes means the mechanism which allows the brakes to be applied when the vehicle is not in use or a malfunction should occur in the operation of the service brakes. Active or service brakes refers to the mechanism which provides for the brakes to be applied directly by the operator to slow the vehicle when moving on to bring it to a halt. It is understood that the term "vehicle" includes aircraft.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary axial cross-section taken through a brake assembly in accordance with the present invention;

FIG. 1a is a fragmentary enlarged view similar to FIG. 1 of a detail shown in FIG. 1;

FIG. 8 is an enlarged fragmentary cross-section of a detail shown in FIG. 1;

FIG. 9 is an enlarged fragmentary front elevation of the brake assembly with parts removed to view further details of the present invention;

DESCRIPTION OF THE PREFERRED EMBODIMENTS

Figure 2:
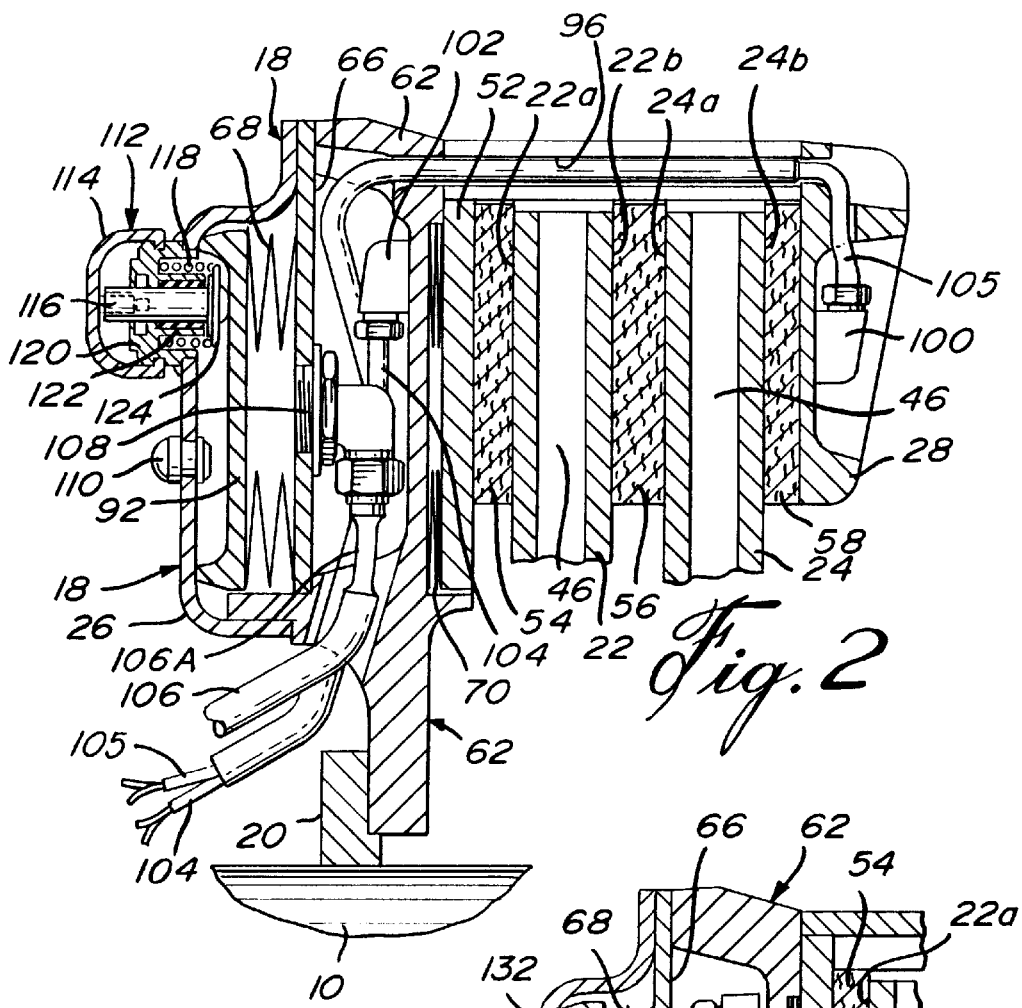
FIG. 2 is an enlarged fragmentary cross-section of a detail of the brake assembly.
Figure 3:
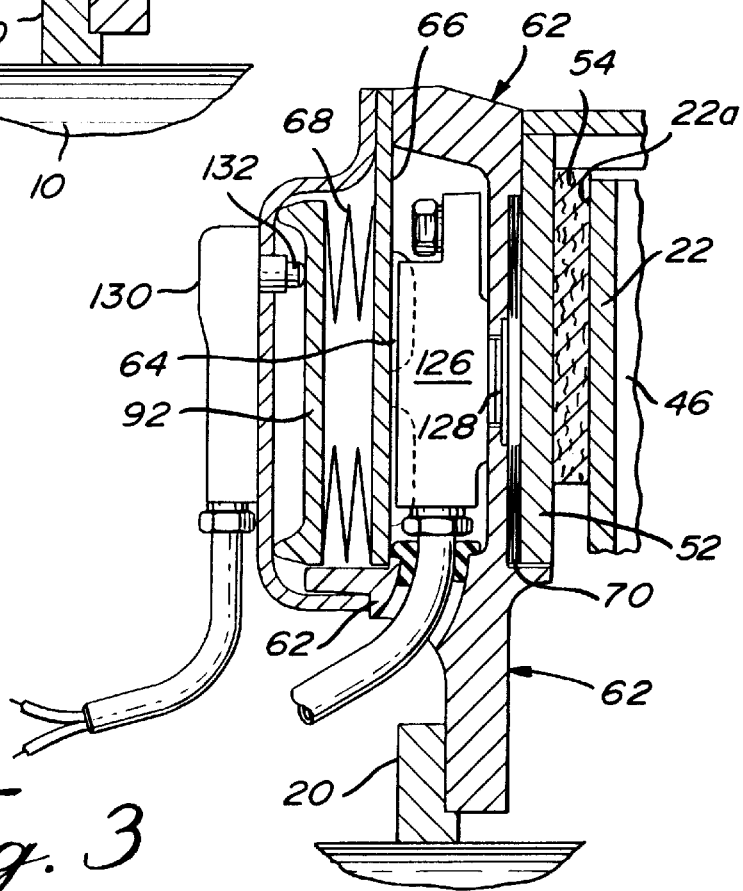
FIG. 3 is a further fragmentary enlarged axial cross-section taken of a further detail of the brake assembly.
Figure 5:
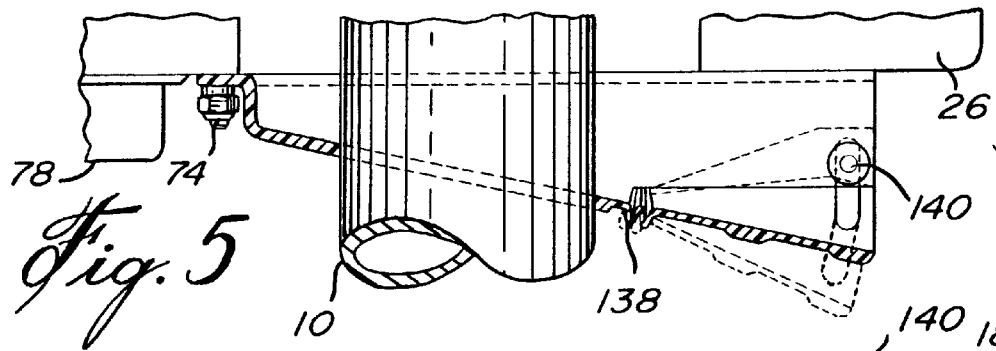
FIG. 5 is a horizontal view partly in cross-section taken along lines 5—5 of FIG. 4.

Referring to FIGS. 1 to 3 the wheel assembly is shown with an axle 10. Axle 10 is a dead axle and bearings 14 mount the wheel 12 for rotation thereabout. An adapter sleeve 16 is mounted to the wheel 12 and extends concentrically over the axle 10 within the disc brake housing 18. A mounting ring 20 is fixed to the axle 10 and the housing 18 is mounted to the mounting ring 20. Two radial vented rotor discs 22 and 24 are shown within the housing 18. The housing 18 includes an annular housing wall 26 on the inboard side of the assembly, an annular housing wall 28 on the outboard side, and the whole is surrounded by a peripheral wall 30. Ventilation openings 32 are provided in the peripheral wall 30. Nut and bolt arrangements 34 secure the housing walls 26, 28, 30 and intermediate wall 62 together to form the housing 18.

The adapter sleeve 16 has axial splines 44 and the annular rotor brake discs 22 and 24 include disc openings 36 and 38 at the inner margins, respectively and the openings are interspersed with teeth 40 and 42. The teeth 40 and 42 engage the splines 44, thereby providing limited axial movement to the discs 22 and 24 while entraining the discs with the wheel 12.

Each brake disc 22 and 24 is provided with generally radial vent channels 46. It has been found that it is possible to maintain brake discs having vented channels within reasonable axial dimensions or thickness, by making the discs out of a composite of aluminum called "DURALCAN". Thus, it is possible to provide two or more brake discs in a space where only one vented cast iron brake disc was previously possible. The openings 36 and 38 of the discs 22 and 24 provide a ventilation passage as will be described later. An annular air deflector 48 is provided on adapter sleeve 16 in the plane of the housing wall 28.

The brake shoe 50 includes an annular backing plate 52 axially movable within the housing 18 to which is mounted a brake lining 54. The backing plate 52, brake lining 54, and annular brake lining 56 are provided with peripheral slots and teeth which engage between splines 34a of the housing to restrain them from rotation but to allow them to slide axially. The brake lining 54 is adapted to frictionally engage the planar radial disc surface 22a. Annular brake lining 56 is provided between the discs 22 and 24 while annular brake lining 58 is mounted to the housing wall 28.

Annular spacing rings 152 are provided in the housing wall 30 and on the removal of the spacing rings 152 the housing will be reduced in axial dimension, thereby compensating for the wear on the linings 54, 56 and 58, and the wear on discs 22 and 24, as will be described later.

An intermediate wall 62 is mounted to the mounting ring 20 on the axle 10 by means of bolt and nut arrangements 71. Of course the intermediate wall 62 may be welded to mounting ring 20. The intermediate wall 62 also serves to support the housing wall 26, cylindrical wall 30, and housing wall 28 by means of the nut and bolt arrangements 74 and 34. Ventilation channels 64 are provided in the intermediate wall 62 while axial ventilation openings 148 are provided in spaced apart relationship near the inner opening of the annular intermediate wall 62 or in ring 20.

In the present embodiment a plate 66 is placed against the intermediate wall 62 and is bolted thereto by means of nut and bolt arrangements 74 and 34 as shown. This plate 66 acts to support the bladder 68. Bladder 68 is an annular bladder made of stainless steel sheets, welded together as shown in FIG. 2. Air under pressure is fed to the bladder 68 through the tube 106 and inlet 108. Other gases may also be used to inflate the bladder. Stoppers (not shown) may be provided on the plate 66 adjacent the bladder 68 to prevent the bladder 68 from being crushed accidentally.

The spring abutment member 92 is mounted for axial movements relative to the intermediate wall 62. The spring abutment member 92 is in the form of a spider with legs 94 spaced about the periphery of an annular plate 92A and integral therewith. The legs 94 extend through openings 72 in the intermediate wall 62. Seals 94A are provided in the openings 72 surrounding the legs 94 in order to prevent dust, oil or other debris from entering any further into the housing. The legs 94 engage the backing plate 52 near the peripheral edge thereof. In view of the stresses on the peripheral edge of the backing plate 52, the backing plate 52 may be constructed with a slight flare in the direction of the legs to compensate for the deflection which would apply when the legs 94 come into contact at the peripheral edge of the backing plate 52. The ends of legs 94 might also be provided with a slight beveled angle 94b to compensate for such stresses.

Springs 90 urge the spring abutment plate 92 towards the brake shoe 50. A plurality of springs 90 are provided in annular spaced apart locations on the housing wall 26, each within a bell cover 78 fitted within a respective opening 76 on the wall 26. The bell covers 78, in one embodiment have a rotary bayonet type of connection to engage the housing wall 26 so that they can be removed in order to replace the springs 90 for instance. A nut 80 having a flange 82 is provided exteriorly of the bell cover 78. The nut 80 engages the threads of bolt 84. The head of the bolt 84 is in a blind sleeve 86 which has a flange 88 and which abuts the coil spring 90. Thus, if it is necessary to remove the tension of the springs 90 against the spring abutment plate 92 the nut 80 is rotated to point where the head of the bolt 84 moves the blind sleeve 86 towards the left in FIG. 1 thereby releasing the spring 90 from the spring abutment member 92. The nut 80 has a rivet shoulder 80A to retain the nut to the bell cover 78. Although a coil spring 90 is shown, other types of springs such as an annular disc spring may be used.

To provide a service brake, a bladder 70 is contemplated between the intermediate wall 62 and the backing plate 52 of brake shoe 50. The bladder 70 may be supplied with a gaseous fluid under pressure by an inlet similar to inlet 108 and tube 106.

During an emergency or safety brake mode, the springs 90 urge against the spring abutment plate 92 which in turn presses the legs 94 against the backing plate 52 of the brake shoe 50 to press the brake linings 54, 56 and 58 against the wear surfaces on the brake discs 22 and 24.

In other words, when the parking brakes or service brakes are applied, the pressure from the brake shoe assembly 50 moves the disc 22, brake lining 56 and disc 24 axially such that the friction surfaces 22a, b, 24a, b on discs 22, 24 frictionally engage the brake linings 54, 56 and 58.

Thus, the springs 90 provide a safety brake, for the vehicle which would typically be a truck, tractor, or trailer. Once the truck or tractor is in operation, and the safety brakes are to be released, air pressure would be supplied to the bladder 68 by means of tube 106 and inlet 108, thereby expanding the bladder 68 to move the spring abutment member 92 axially to overcome the springs 90 and thus removing the pressure on the brake shoe 50, thereby allowing the discs 22 and 24 and thus the wheel to rotate freely. During the operation of the vehicle, when it is necessary to apply the active brakes, air pressure would be directed through inlet 128 (FIG. 3) to the bladder 70 in order to move the brake shoe 50 axially to positively apply the brakes. At the same time, air pressure could be released from the bladder 68, if necessary, although it is contemplated that the safety brakes would normally be kept released during operation.

As a safety feature, if the air pressure was to fall under a predetermined level, the springs 90 would overcome the bladder 68 and cause the safety brakes to be applied.

A quick release valve 126 is located on the intermediate wall 62 and communicates with the bladder 70. The quick release valve 126 will operate when it is required to deflate the bladder 70. At the same time the exhaust from the quick release valve will be directed along the intermediate wall 62 through ventilation channels 64 thereby enabling the intermediate wall 62 to be cooled as well as the adjoining parts of the housing such as plate 66. The gas under pressure within the bladder 70 cools during decompression as it is released.

On the other hand a choke or restricted passage 106A is provided on the conduit 106 to provide a slow release from the bladder 68 in order to avoid sudden violent application of the safety brakes while the vehicle is moving if a service brake malfunction should occur. A time delay valve might also be provided instead of the choke.

It has been contemplated to interconnect the bladders 68 and 70 by suitable valves to allow air to pass from one bladder to the other in the event that it is desirable to apply the parking brakes and the service brakes simultaneously. However, in most cases, the bladders 68 and 70 would be operated independently.

The end edge of the sleeve 16 may be provided with teeth and an antilock-brake sensor or counter sensor 150 may be mounted to the intermediate wall 62 as shown in FIG. 1 for the purpose of sensing the movement of the teeth 151 as the adapter sleeve 16 rotates.

Figures 13A, 13B:
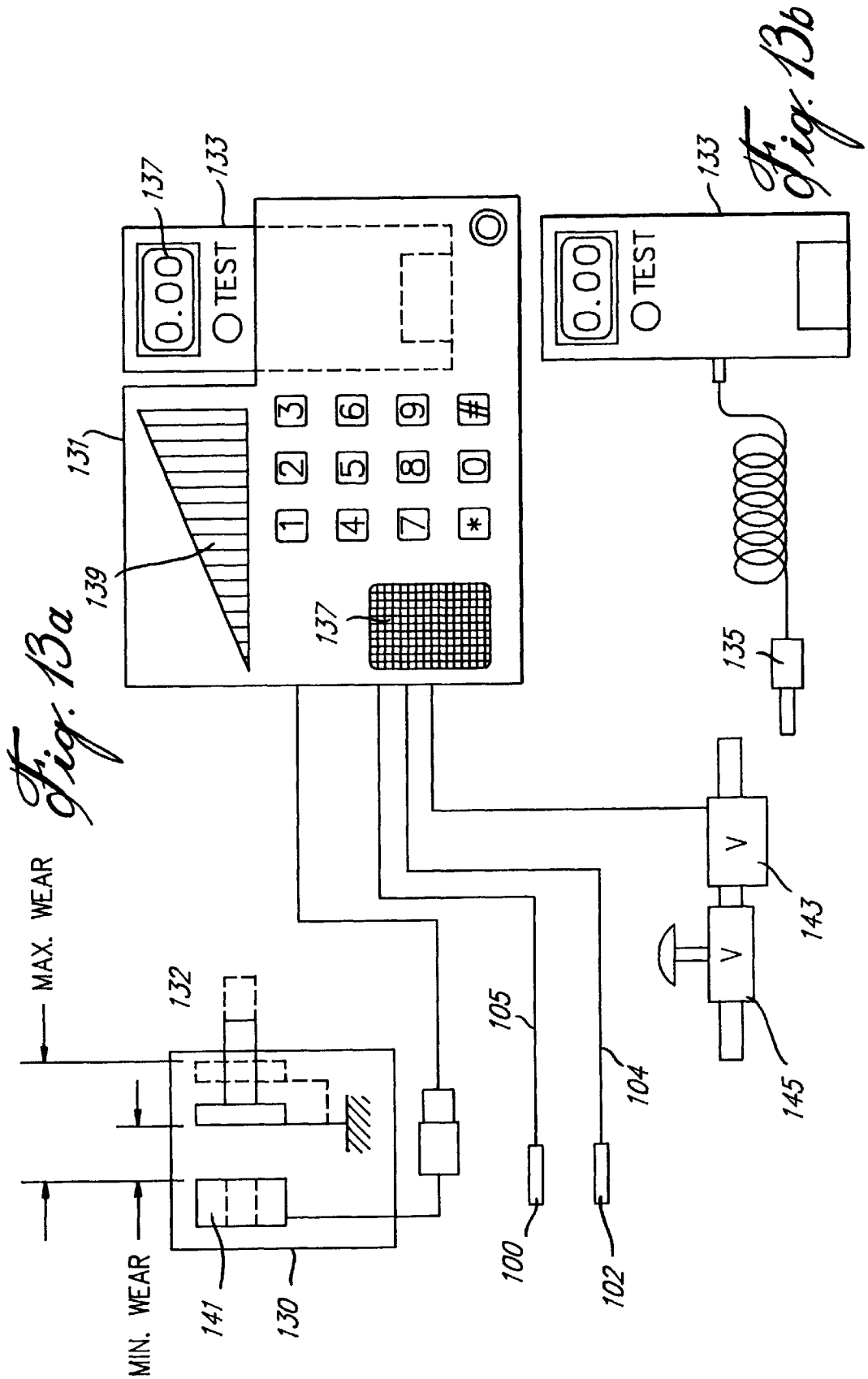
FIGS. 13a and 13b show an embodiment of a control panel for use in an embodiment of the present invention as shown in FIG. 3.

As shown in FIGS. 2 and 13a the brake assembly is provided with a thermal sensor 102 connected to the intermediate wall 62 and having a lead 104. A thermal sensor 100 may be provided on the housing wall 28 with a lead 105 extending through a passage 96 provided for in the housing wall 30. The thermal sensors 100 and 102 can provide temperature data with respect to the heat generated in the disc brake assembly, particularly near the disc. For instance the sensor 100 is right at the housing wall 28 next to the brake lining 58 near the disc 24. The thermal sensor 102 will indicate the temperature of the intermediate wall 62. Other sensors may be provided. The sensors 100 and 102 communicate with a temperature indicator on the control panel in the vehicle. Only one wheel need be monitored in such a manner as it will give an indication of the type of heat generated in all the wheels of the same vehicle.

A warning device, connected to the brake thermal sensors, may be provided on the control panel in the cab. The warning device may be an audible signal such as a buzzer or a recorded voice emitting from speaker 138, or a visual diode graphic screen 139 with different colors to provide information on the temperature of the brakes. As is well known when the temperature of the brakes reaches a certain temperature, the brake pads begin to break down chemically, causing brake fading. The warning device could alert the operator to stop the vehicle in order to allow the brakes to cool down before the brakes reach a temperature level that might cause failure.

Another feature provided in the brake assembly described herein is a wear sensor as shown in FIGS. 2, 3, 13a and 13b. Because of the particular axial movement of the present brake assembly a wear sensor can be provided between the housing wall 26 and the spring abutment member 92 and the distance between the two elements measured, particularly when the brakes are applied through the parking brakes under the urging of springs 90.

In one embodiment as shown in FIG. 2 the wear sensor 112 includes a rubber cap 114 and a plunger 116 urged by a spring 118 within a blind sleeve 120. A bearing sleeve 122 is provided within the sleeve 120 to allow the plunger to slide towards the spring abutment member 92 under the urging of the spring 118. The plunger is provided with a flange 124 to receive the spring 118.

Another form of wear sensor is shown in FIGS. 3 and 13a. Wear sensor 130 is an electronic sensor including a plunger 132, spring mounted within the housing of sensor 130, for movement relative to magnetic coil 141, and urged against the spring abutment member 92. Sensor 130 communicates with a brake wear indicator on the control panel 131 shown in FIG. 13a. The control panel 131 would be mounted in the cab. Only one wheel need be monitored as it gives a reliable indicator of the amount of wear occurring at all the wheels of a vehicle.

A still further wear sensor could be provided by allowing an opening in the housing wall 26, closed by a rubber nipple 110. When the rubber nipple is removed a measuring gauge can be inserted to determine the distance between the wall 26 and the spring abutment member 92 when the parking brake is applied.

As shown in FIG. 13b the measuring gauge may be a portable computerized unit 133 which can be plugged in to the control panel 131 shown as shown in FIG. 13a. The unit 133 would include a probe connector which could be adapted to be inserted into the electronic sensor 130. It is also contemplated to provide a sensor 130 on each wheel. Rather than have to wire each wheel to the control panel the driver or maintenance person can go to each wheel with the portable computerized unit 133 and connect the probe type connector 135 to the electronic sensor 130 and take an individual reading. A display 137 is provided on unit 133 to provide information easily interpreted by the driver.

The unit 133 can also be inserted into the control microprocessor represented by control panel 131. Control panel 131 would include a conventional micro-processor to continuously interpret the data from the unit 133 directly from the electronic sensor 130.

It is also contemplated to provide the brake sensors on the housing wall 28 so that the measurements can be taken against a backing plate associated with brake shoe 58 when the latter is made to move axially and the bladder 70 is mounted on the wall 28 (not shown). The service brake must be applied in order to take a proper reading.

With the use of the brake wear sensors or gauges a warning device can be provided on the control panel in the cab of the vehicle which would include an audible signal through speaker 138 when the brake linings and discs have been worn to a predetermined level to at least warn the operator to replace the brake linings and discs or at least plan the maintenance thereof. It may even be contemplated to provide an interlock valve 143 which would intervene at the parking brake control valve 145 to impede the release of the parking brakes when the brake wear has exceeded accepted levels of wear. In any event the brake wear system can give warning or control at different levels of brake wear. To release the interlock valve 143 an access code will be necessary to enter the microprocessor.

Figure 4:
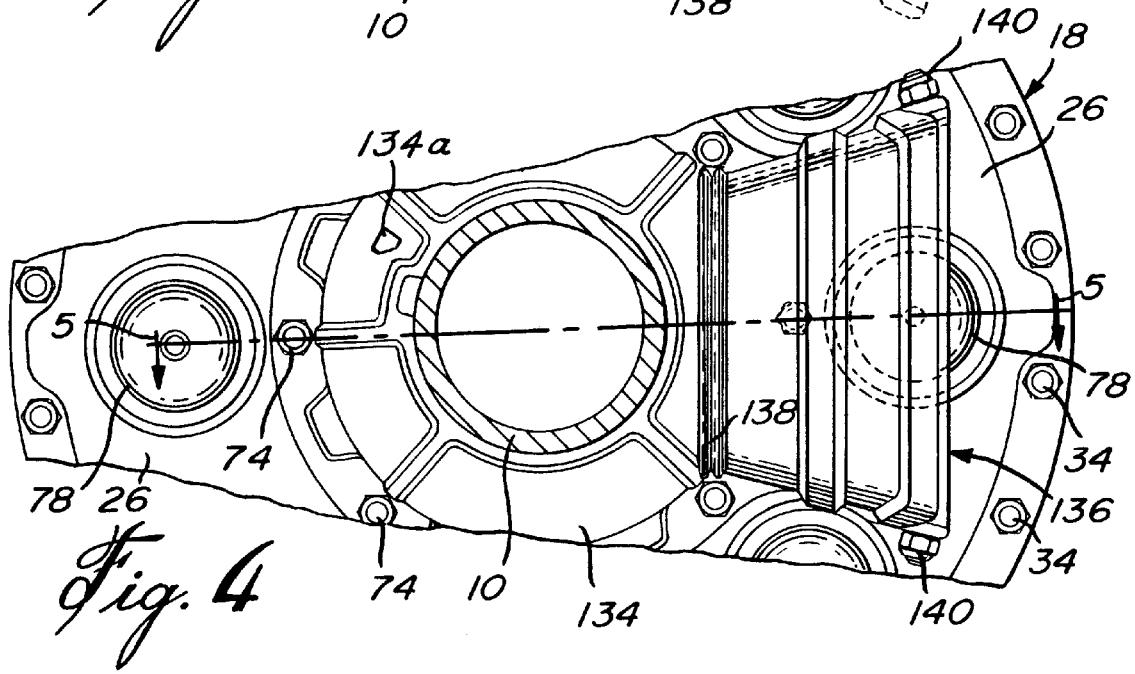
FIG. 4 is an enlarged fragmentary front elevation of the brake assembly.

A ventilation system for the disc brakes is provided. As partially, previously described and shown in FIGS. 1 and 9, openings 148 are located in the intermediate wall 62 and as shown in FIG. 4, or in ring 20, a plenum 134, in the form of an annular cover, may be placed over the openings 148. The plenum 134 communicates with a scoop 136. The scoop 136 may be mounted on the housing wall 26 and would be facing the normal direction of travel of the vehicle so that air flow would be deflected into the plenum 134, through the openings 148 to the discs 22 and 24 and in particular through the openings 36 and 38. Because of deflector or baffle 48 the air would be forced upwardly through the ventilation channels 46 of the discs 22 and 24. The baffle 48 could be eliminated if the disc 24 is closed to the adapter sleeve 16. The discs 22 and 24 act as impellers creating a negative pressure in the area of the openings 36 and 38 thereby drawing air and pumping it to the periphery of the discs and exhausting it through the ventilation openings 32 allowing a great amount of heat to be dissipated in this way. The scoop 136 and the plenum 134 may be a molded plastic member with a hinge 138 molded therein along with nut and bolt adjustments 140 to open or reduce the opening of the scoop 136.

It has been contemplated to use this ventilation system for a different purpose, such as in an aircraft utilization. Accordingly, by providing a similar brake configuration on the wheels of the landing gear of an aircraft, that is with scoop 136, ventilation openings 32 and ventilated discs 22 and 24, a considerable flow of air can be passed through the (released) brake ventilation system causing the wheels to rotate. It is particularly useful to have the wheels rotating at an equivalent ground speed, at the moment of landing. In order to control the rate of rotation of the wheels, that is so that they do not overrotate, the scoop 136 may be remotely adjusted and the active brakes could be applied. The wheel speed may be calibrated to the ground speed of the aircraft using a micro-processor using information from the counter sensor 150 and the aircraft ground speed data. The precise rate of rotation could be achieved by having the microprocessor modulate the scoop opening and the brakes to compensate for the excess of torque generated by the air flow through the brakes. This would be an important safety factor with respect to aircraft tires.

Figure 6:
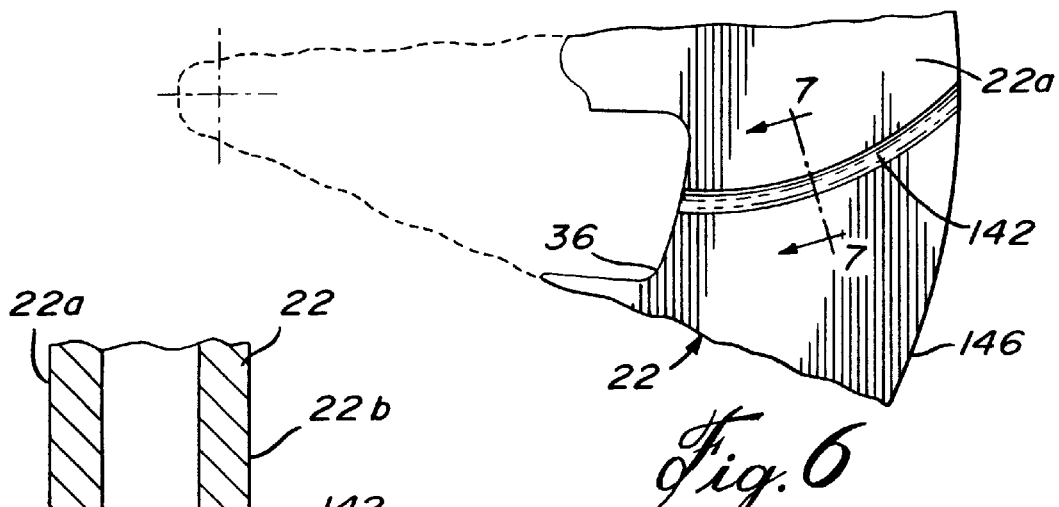
FIG. 6 is an enlarged fragmentary side elevation of a detail of the present invention.
Figure 7:
FIG. 7 is an enlarged fragmentary vertical cross-section taken along line 7—7 of FIG. 6.

A fragment of a brake disc 22 is shown in FIGS. 6 and 7 with the surfaces 22A and 22B illustrated. A groove 142 extends somewhat radially of the surfaces 22A and 22B and has a semi-circular cross-section. In a specific example, the groove may be 0.09" in depth with a width of 0.25" and a radius of 1/8 of an inch. It has been found that the provision of such a groove allows air to enter, when the brakes are released and the discs are rotating, to form a slight air cushion between the brake linings and the friction surface on the disc, thereby eliminating dragging and helping to cool the friction surfaces. At the same time the groove allows the brake surfaces to be cleaned by providing a drainage channel for any liquid forming on the brake linings or debris between the friction surface of the disc and the linings.

It has also been found that by providing a coating on the disc brake surface the heat is more easily dissipated. This coating may be a ceramic with aluminum particulates mixed therein and which has a particular heat sink and wear resistance properties. The coating may also be titanium carbo-nitride or chromium carbide. A coating is presently being developed by "SERMATECH INTERNATIONAL INC." for military purposes. DLC, a diamond-like carbon or an amorphous diamond having a hardness of 1000–5000 Vickers which is produced by DIAMONEX INCORPORATED of Allentown, Pa., U.S.A. can also be used.

It has also been contemplated to provide a spray mix where water is sprayed into the plenum 134 through opening 134a to mix with ventilation air being deflected into the brake assembly to enhance the cooling of the brake assembly.

In the present embodiment, and as shown in FIG. 8, the bladder 70, which is in the form of an annular ring, is provided with an external annular dust cap 70a and an internal dust cap 70b. The dust caps 70a and 70b are provided to prevent debris from entering between the accordion-like fins formed in the bellows-like bladder.

In the embodiment shown in FIG. 10, the bladder 290 adjusts the distance between lining 273 and friction surface 232a of disc 232, as will be described. In this embodiment, plate 223 is provided with integral posts 223a, which slide in bushings 266 mounted to the circumferential wall 226. The bushings 266 prevent posts 223a from jamming and thus plate 262 to slide parallel to intermediate wall 244. These posts 223a engage against the movable plate 262. Posts 264 extend from plate 262 to engage the backing plate 272.

A bladder 290 is provided between plate 223 and housing wall 222 which is bolted to the housing walls 226 and 248, as shown. The bladder 290 may be oil or grease filled. In either case, the increase of the volume in the bladder 290 will tend to distance the plate 223 from the wall 222, thereby moving the parking brake assembly including spring 256, spring abutment plate 262, posts 264, backing plate 272, and lining 273 closer to the disc 232. When the posts 223a have engaged the plate 262, the bladder 290 is used to compensate for brake disc or lining wear by pressing the plate 223 and posts 223a against the cage formed by plate 262 and posts 264.

Figure 10:
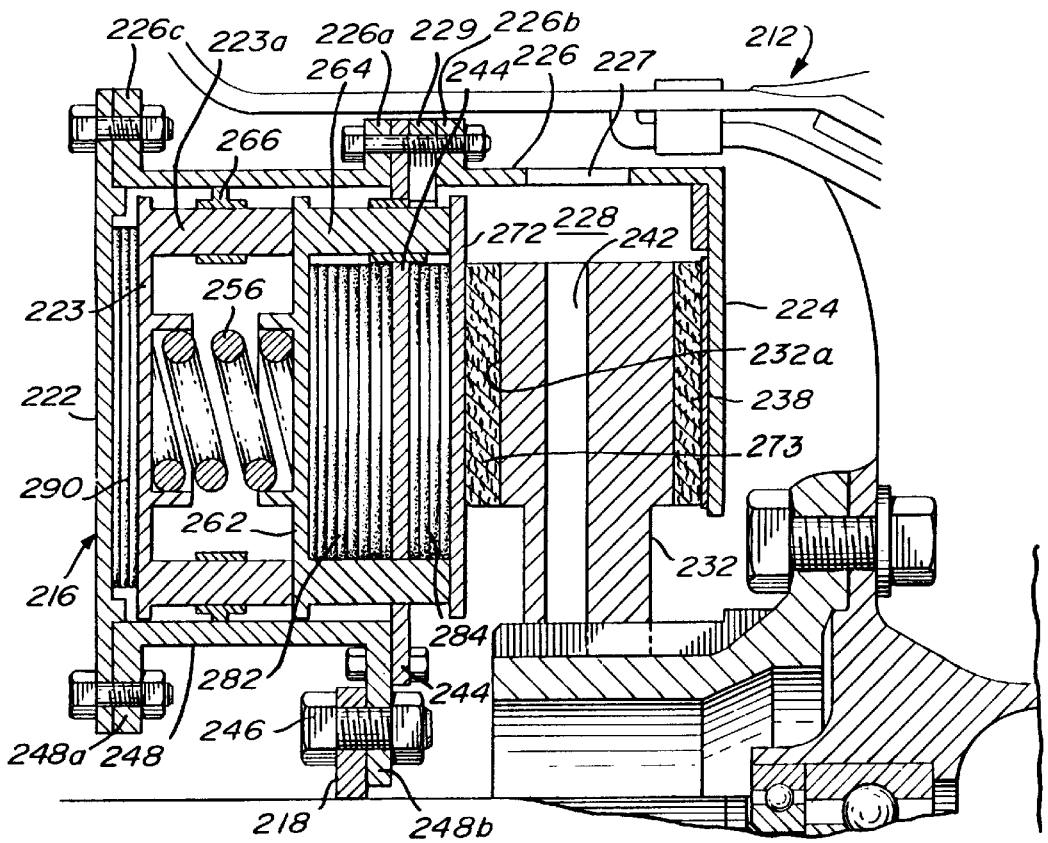
FIG. 10 is a fragmentary axial section of another embodiment of a detail of the present invention.

As shown in FIG. 10, the bladders 282 and 284, which are operated by air pressure, can be controlled to act as a positive force to apply the brakes, that is, when air pressure is increased in bladder 284, or to alternatively remove the brakes against the force of spring 256 by increasing the air pressure in bladder 282.

It is also contemplated that the bladders 70, 284, in FIGS. 1 and 10 respectively, could be located between the housing walls 28, 224 and a backing plate for brake linings 58, 238.

Instead of the bladder 290, the compensation for brake wear could be provided by the compensating ring 229. Ring 229 is a segmental ring which can easily be removed from between intermediate wall 244 and flange 226b of housing wall 226. A compensating ring (not shown) may be provided between intermediate wall 244 and flanges 248b and 226a. The compensating ring 229 could also be placed between the housing wall 222 and the mounting flange 226c therefor. A compensating ring (not shown) would then be mounted between wall 222 and flange 248a. The idea is to allow for a decrease of the axial length of the housing 216 in order to compensate for wear of all parts of the braking system.

Figure 11:
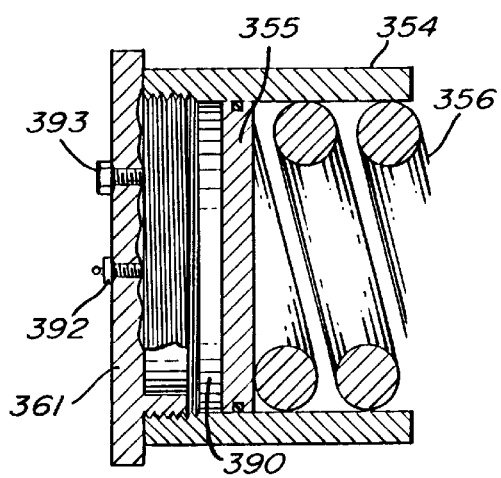
FIG. 11 is an enlarged fragmentary axial section showing still another embodiment of the detail shown in FIG. 10.

FIG. 11 shows an embodiment of the device for adjusting the spring length to increase the force against the brake shoes or for compensating for brake wear. In the embodiment shown, a grease nipple 392 in cap 361 can be utilized to insert grease or oil into the cavity 390 to displace the wall 355 in cylinder 354. When it is required to release the spring 356, the plug 393 can be released to allow the grease or oil to exit, thereby allowing the wall 355 to slide towards the cap 361.

Figure 12A:
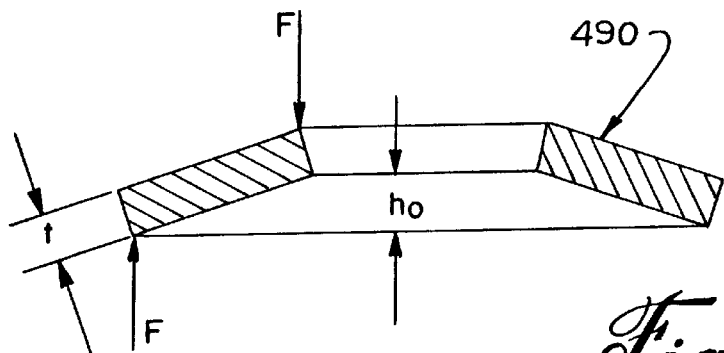
FIG. 12a is a schematic view of a spring disc which can be used in an embodiment of the present invention.
Figure 12B:
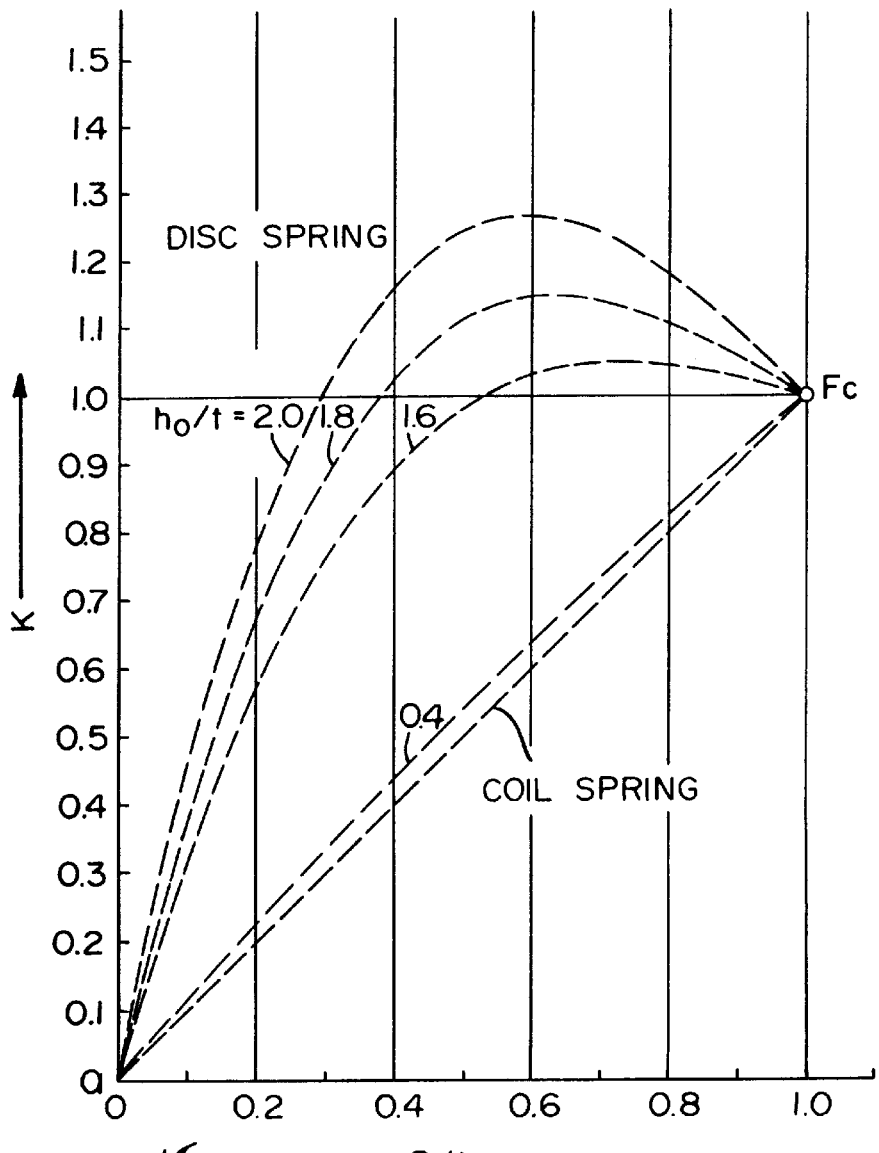
FIG. 12b is a graph showing relative spring load characteristics of the spring disc.

In another embodiment, disc springs 490 could be used instead of coil springs 90, 256, 356. A single disc spring is illustrated in FIG. 12a and the characteristics thereof are shown in FIG. 12b. For a more ample description of the disc spring, reference is made to the "Schnorr Handbook For Disc Springs" published 1983 by Adolf Schnorr GmbH & Co. KG, P.O. Box 60, D-7032 Sindelfingen 6, Germany. It has been found that by stacking disc springs in different configurations, different spring rates can be obtained.

One characteristic of the disc spring which is particularly useful in the present invention is that the full deflection spring load characteristic does not decrease until a larger percentage of the spring deflection has occurred, i.e. approximately 50% to 70% when ho/t is larger than 1.6 and smaller than 2.0. The distance represented by the travel within these limits may represent the compensation for wear. With other spring characteristics the same travel, i.e. 50% to 70% would result in a significant reduction in the spring load characteristic as shown in FIG. 12b where ho represents the formed height of an unloaded single disc in mm;

t represents the thickness of a single disc spring in mm;

S is the deflection in mm;

K=F/Fc;

F is the spring load;

Fc is the calculated load given by a single disc pressed flat.

We claim:

1. A disc brake assembly for a vehicle wheel on a vehicle, wherein the wheel includes a hub journaled to an axle on the vehicle, the disc brake assembly is within the confines of the wheel and concentric with the axle, the disc brake assembly including an annular housing mounted to the vehicle and a first annular radial disc having first and second radial planar braking surfaces and at least a second annular radial disc having at least a third radial planar friction surface, and intermediate annular brake lining is provided between the first and second radial discs, and means are provided for restraining the intermediate brake lining from rotating with the discs but allowing axial movement thereof and means for mounting the first and second radial discs includes an adapter sleeve fixed to the wheel and provided with axial splines such that at least the first radial disc is capable of axial movement, a first brake shoe in the form of a radial annular member having at least a planar braking surface provided adjacent the first planar braking surface of the first radial disk, movable axially towards and away from the first braking surface of the disc for friction engagement therewith and release thereof, means provided on the housing for restraining the first brake shoe from rotating with the disc, a first annular radially extending fluid bladder being provided between the housing and the first brake shoe, the first bladder, when expanded, forcing the first brake shoe against the first braking surface of the first radial disc, causing the first radial disc to move axially on the adapter sleeve such that the second braking surface of the first radial disc contacts the intermediate brake lining which in turn moves axially to contact the third braking surface of said second radial disc.

2. A disc brake assembly as defined in claim 1, wherein the second radial disc is provided with a fourth radial braking surface on the other side of the second radial disc relative to the first radial disc, and a second annular brake shoe is mounted to the housing adjacent the fourth braking surface of the second radial disc, whereby the second brake shoe is restrained from rotation with the second radial disc, the adapter sleeve provided with the axial splines such that the first and second radial discs are capable of axial movement, thereby allowing the second radial disc to move axially such that the fourth braking surface of the second radial disc comes into frictional contact with the second brake shoe when fluid is allowed to expand the bladder.

3. A disc brake assembly as defined in claim 1, wherein the second radial disc is provided with a fourth radial braking surface on the other side of the second radial disc relative to the first radial disc, and a second annular brake shoe is mounted within the housing adjacent the fourth friction surface of the disc; the adapter sleeve fixed to the wheel and provided with axial splines enables the first and second radial discs to be capable of axial movement.

4. A disc brake assembly for a vehicle wheel on a vehicle, wherein the wheel includes a hub journaled to an axle on the vehicle, the disc brake assembly is within the confines of the wheel and concentric with the axle, the disc brake assembly including an annular housing mounted to the vehicle and at least an annular radial disc within the housing and means mounting the disc to the wheel, the disc having at least a first radial planar braking surface, a first brake shoe in the form of a radial annular member having at least a planar braking surface provided adjacent the first planar braking surface of the radial disc movable axially towards and away from the first braking surface of the disc for friction engagement therewith and release thereof, means provided for restraining the first brake shoe from rotating with the disc, a first annular radially extending fluid bladder being provided between the housing wall whereby the first bladder, when expanded, forces the first brake shoe toward the first braking surface of the disc, wherein at least a shallow groove is defined across the first braking surface of at least the radial disc generally radially thereof whereby and air cushion can be provided between the rotor disc and the braking surface of the brake shoe when the rotor disc is rotating and the brake shoe means is released from the braking surface of the disc and the groove provides a drainage channel for removing debris from between the brake shoe means and the braking surface of the disc.

5. A disc brake assembly for a vehicle wheel on a vehicle, wherein the wheel includes a hub journaled to an axle on the vehicle, the disc brake assembly is within the confines of the wheel and concentric with the axle, the disc brake assembly including an annular housing mounted to the vehicle and at least an annular radial disc within the housing and means mounting the disc to the wheel, the disc having at least a first radial planar braking surface, a first brake shoe in the form of a radial annular member having at least a planar braking surface provided adjacent the first planar braking surface of the radial disc movable axially towards and away from the first braking surface of the disc for friction engagement therewith and release thereof, means provided for restraining the first brake shoe from rotating with the disc, a first annular radially extending fluid bladder being provided between the housing whereby the first bladder, when expanded, forces the first brake shoe toward the first braking surface of the disc, wherein the braking surface of at least the radial disc is provided with a coating chosen from a composition including ceramic and aluminum particles, silicon carbide, titanium carbo-nitride, DLC, whereby heat is dissipated from the surface and wear resistance is enhanced.

6. A disc brake assembly for a vehicle wheel on a vehicle, wherein the wheel includes a hub journaled to an axle on the vehicle, the disc brake assembly is within the confines of the wheel and concentric with the axle, the disc brake assembly including an annular housing mounted to the vehicle and at least an annular radial disc within the housing and means mounting the disc to the wheel, the disc having at least a first radial planar braking surface, a first brake shoe in the form of a radial annular plate having at least a planar braking surface provided adjacent the first planar braking surface of the radial disc movable axially towards and away from the first braking surface of the disc for friction engagement therewith and release thereof, means provided for restraining the first brake shoe from rotating with the disc, an annular intermediate wall member mounted within the housing and fixed thereto extending parallel with the radial disc and located such that the first brake shoe moves axially between the intermediate wall and the radial disc, a movable spring abutment means mounted for axial movement within the housing between the intermediate wall and a housing wall such that the intermediate wall is between the movable spring abutment means and the first brake shoe, rigid pusher link members extending between the spring abutment means and the first brake shoe pass the intermediate wall; a spring means arranged in an annular array and extending between the housing wall and the spring abutment means such that the spring urges against the spring abutment means to press the first brake shoe against the first braking surface of the disc, a first annular radially extending fluid bladder being provided between the intermediate wall and the spring abutment means whereby the first bladder, when expanded, forces the spring abutment means to overcome the spring means to release the first brake shoe from the first braking surface of the disc, wherein a temperature sensor is provided on the intermediate wall in order to determine the temperature of the brake assembly and means are provided for communicating the data.

7. A disc brake assembly for a vehicle wheel on a vehicle, wherein the wheel includes a hub journaled to an axle on the vehicle, the disc brake assembly is within the confines of the wheel and concentric with the axle, the disc brake assembly including an annular housing mounted to the vehicle and at least an annular radial disc within the housing and means mounting the disc to the wheel, the disc having at least a first radial planar braking surface, a first brake shoe in the form of a radial annular plate having at least a planar braking surface provided adjacent the first planar braking surface of the radial disc movable axially towards and away from the first braking surface of the disc for friction engagement therewith and release thereof, means provided for restraining the first brake shoe from rotating with the disc, a first annular radially extending fluid bladder being provided between the housing and the first brake shoe, the first bladder, when expanded, forces the first brake shoe toward the first braking surface of the radial disc, characterized in that a temperature sensor is provided at the first housing wall near the disc in order to determine the temperature of the brake assembly and means are provided for communicating the data.

8. The brake assembly as defined in claim 6 wherein a warning device means is provided on a vehicle to warn the operator of the temperature of the brake assembly.

9. The brake assembly as defined in 7 wherein a warning device means is provided on a vehicle to warn the operator of the temperature of the brake assembly.

10. A disc brake assembly for a vehicle wheel on a vehicle, wherein the wheel includes a hub journaled to an axle on the vehicle, the disc brake assembly is within the confines of the wheel and concentric with the axle, the disc brake assembly including an annular housing mounted to the vehicle and at least an annular radial disc within the housing and means mounting the disc to the wheel, the disc having at least a first radial planar braking surface, a first brake shoe in the form of a radial annular plate having at least a planar braking surface provided adjacent the first planar braking surface of the radial disc movable axially towards and away from the first braking surface of the disc for friction engagement therewith and release thereof, means provided for restraining the first brake shoe from rotating with the disc, an annular intermediate wall member mounted within the housing and fixed thereto extending parallel with the radial disc and located such that the first brake shoe moves axially between the intermediate wall and the radial disc, a movable spring abutment means mounted for axial movement within the housing between the intermediate wall and a housing wall such that the intermediate wall is between the movable spring abutment means and the first brake shoe, rigid pusher link members extending between the spring abutment means and the first brake shoe pass the intermediate wall; a spring means arranged in an annular array and extending between the housing wall and the spring abutment means such that the spring urges against the spring abutment means to press the first brake shoe against the first braking surface of the disc, a first annular radially extending fluid bladder being provided between the intermediate wall and the spring abutment means whereby the first bladder, when expanded, forces the spring abutment means to overcome the spring means to release the first brake shoe from the first friction surface of the disc, wherein the end of the rigid pusher link members are provided with a slight beveled angle.

11. A brake assembly as defined in claim 9 wherein the first brake shoe is provided with a backing plate that is constructed with a slight flare in the direction of the rigid pusher link members.

* * * * *